United States Patent
Suzuki et al.

(10) Patent No.: US 8,805,432 B2
(45) Date of Patent: Aug. 12, 2014

(54) MOBILE COMMUNICATION TERMINAL AND TRANSMISSION POWER CONTROL METHOD OF THE SAME

(75) Inventors: Hidetoshi Suzuki, Yokohama (JP); Takashi Okada, Yokohama (JP); Teruo Onishi, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 52 days.

(21) Appl. No.: 12/743,214

(22) PCT Filed: Nov. 17, 2008

(86) PCT No.: PCT/JP2008/070862
§ 371 (c)(1),
(2), (4) Date: May 14, 2010

(87) PCT Pub. No.: WO2009/064005
PCT Pub. Date: May 22, 2009

(65) Prior Publication Data
US 2010/0273518 A1 Oct. 28, 2010

(30) Foreign Application Priority Data
Nov. 15, 2007 (JP) ................................. 2007-296760

(51) Int. Cl.
*H04B 1/00* (2006.01)
*H04B 7/00* (2006.01)
*H01Q 11/12* (2006.01)
*H04B 1/04* (2006.01)
*H04M 1/66* (2006.01)
*H04M 1/68* (2006.01)
*H04M 3/16* (2006.01)
*H04W 4/00* (2009.01)
*H04B 7/216* (2006.01)
*H04B 14/06* (2006.01)
*H04K 1/10* (2006.01)
*H04L 27/28* (2006.01)

(52) U.S. Cl.
USPC .......... 455/522; 455/69; 455/127.3; 455/410; 370/328; 370/342; 375/245; 375/260

(58) Field of Classification Search
CPC ... H04W 52/08; H04W 52/225; H04W 52/24; H04W 52/146; H04W 52/228; H04W 52/50; H04W 52/221; H04W 52/226; H04W 52/30; H04W 52/288; H04W 88/06; H04B 17/007; H04B 7/0615; H04L 1/0021; H04L 1/0025
USPC .............. 455/12.1, 68, 69, 117, 127.1, 127.3, 455/434, 522, 10, 13.4, 39, 67.11, 115.1, 455/108, 127.2, 410, 561; 370/248, 318, 370/319, 320, 331, 332, 335, 342, 394, 252, 370/322, 328, 311; 375/297, 245, 146, 345, 375/130, 296
See application file for complete search history.

(56) References Cited

U.S. PATENT DOCUMENTS

| | | | | |
|---|---|---|---|---|
| 5,425,030 A * | 6/1995 | Comroe et al. | ............... | 370/336 |
| 5,835,846 A * | 11/1998 | Furukawa et al. | .............. | 455/10 |
| 6,163,705 A * | 12/2000 | Miya | .............................. | 455/522 |
| 6,272,325 B1 * | 8/2001 | Wiedeman et al. | ........... | 455/117 |
| 6,330,455 B1 * | 12/2001 | Ichihara | ........................ | 455/522 |
| 6,628,732 B1 * | 9/2003 | Takaki | .......................... | 375/345 |
| 6,832,098 B1 | 12/2004 | Matsunami et al. | | |
| 7,295,855 B1 * | 11/2007 | Larsson et al. | ................ | 455/522 |
| 2002/0142791 A1 * | 10/2002 | Chen et al. | ..................... | 455/522 |
| 2003/0072274 A1 * | 4/2003 | Futakata et al. | .............. | 370/311 |
| 2003/0202490 A1 * | 10/2003 | Gunnarsson et al. | ......... | 370/332 |
| 2004/0110477 A1 * | 6/2004 | Nishimura et al. | ........ | 455/127.1 |
| 2004/0166888 A1 * | 8/2004 | Ahn et al. | ..................... | 455/522 |
| 2005/0009552 A1 * | 1/2005 | Vimpari et al. | ............... | 455/522 |
| 2005/0041615 A1 * | 2/2005 | Hayashi et al. | ............... | 370/328 |
| 2005/0124372 A1 * | 6/2005 | Lundby et al. | ................ | 455/522 |
| 2005/0186923 A1 * | 8/2005 | Chen et al. | ................ | 455/127.1 |
| 2010/0081469 A1 * | 4/2010 | Kazmi et al. | .................. | 455/522 |

CALCULATION PROCESS, DETERMINATION, TARGET AVERAGE TRANSMISSION POWER CALCULATION

FOREIGN PATENT DOCUMENTS

| | | |
|---|---|---|
| JP | 2000-49629 A | 2/2000 |
| JP | 2003-338762 A | 11/2003 |
| JP | 2005-051819 A | 2/2005 |
| JP | 2006-165742 A | 6/2006 |
| KR | 10-2006-0120809 A | 11/2006 |
| WO | WO 02/39603 A1 | 5/2002 |
| WO | PCT/JP2008/070862 | 5/2009 |

OTHER PUBLICATIONS

Korean Office Action w/Translation, dated Jul. 13, 2011, 8 pages total.
PCT/ISA/210 PCT/JP2008/070862, May 22, 2009.
Chinese Office Action w/English translation, dated Aug. 2, 2012, 10 pages total.

* cited by examiner

*Primary Examiner* — Bobbak Safaipour
*Assistant Examiner* — Paul P Tran
(74) *Attorney, Agent, or Firm* — Crowell & Moring LLP

(57) ABSTRACT

The transmission power is decreased in an appropriate manner, while suppressing the deterioration of the line quality to the minimum. A mobile communication terminal 1 controls the transmission power in response to a request given from a base transceiver station 2. When an average transmission power Wa that is an average value of the transmission power in a monitoring period Ta is smaller than a threshold value TH, mobile communication terminal 1 continuously controls the transmission power in response to the request given by the base transceiver station 2. When the average transmission power Wa in the monitoring period Ta is equal to or greater than the threshold value TH, the transmission power is controlled in a transmission power suppressing period Tb that follows the monitoring period Ta so that the average value of the transmission power becomes equal to or smaller than the threshold value in a control period Tc including the monitoring period Ta and the transmission power suppressing period Tb. The average value of the transmission power is thus decreased in the entire control period Tc.

5 Claims, 5 Drawing Sheets

*FIG. 4*

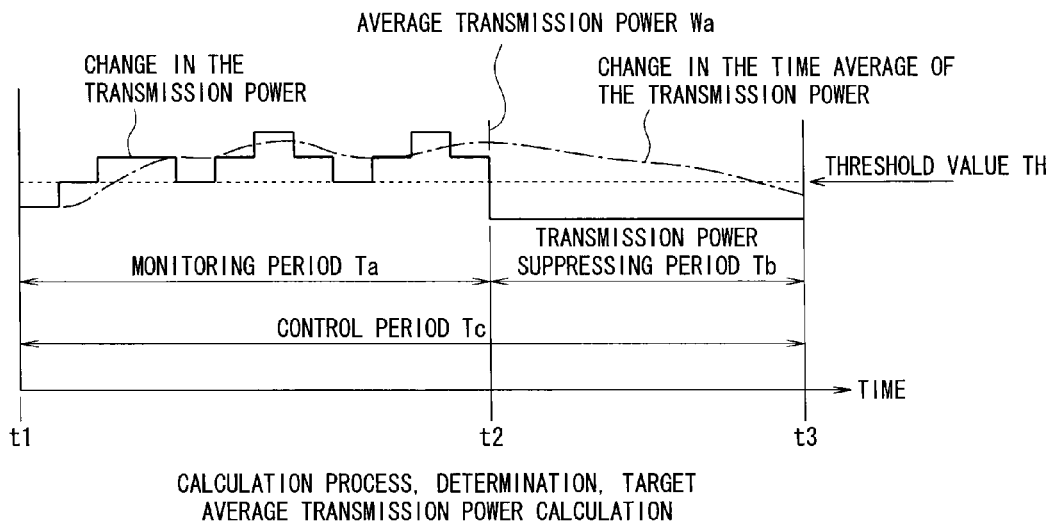

CALCULATION PROCESS, DETERMINATION, TARGET
AVERAGE TRANSMISSION POWER CALCULATION

*FIG. 5*

| | | AVERAGE TRANSMISSION POWER THRESHOLD VALUE TH | MONITORING PERIOD Ta | TRANSMISSION POWER SUPPRESSING PERIOD Tb |
|---|---|---|---|---|
| BASIC ENVIRONMENT | SPEECH COMMUNICATION | TH11 | Ta11 | Tb11 |
| | DATA COMMUNICATION | TH12 | Ta12 | Tb12 |
| | TV TELEPHONE | TH13 | Ta13 | Tb13 |
| | START OF CALL-WAITING STATE | TH14 | Ta14 | Tb14 |
| LOW TRANSMISSION POWER ENVIRONMENT | SPEECH COMMUNICATION | TH21 | Ta21 | Tb21 |
| | DATA COMMUNICATION | TH22 | Ta22 | Tb22 |
| | TV TELEPHONE | TH22 | Ta23 | Tb23 |
| | START OF CALL-WAITING STATE | TH24 | Ta24 | Tb24 |

MOBILE COMMUNICATION TERMINAL AND TRANSMISSION POWER CONTROL METHOD OF THE SAME

TECHNICAL FIELD

The present invention relates to mobile communication terminals and transmission power control methods of the same.

BACKGROUND ART

Conventionally, in mobile communication systems for mobile telephones or the like, the transmission power over radio communication between a base transceiver station and a mobile communication terminal is controlled. Such a transmission power control is generally provided in accordance with the line quality. For instance, in a case where there is a short distance between the mobile communication terminal and the base transceiver station, the line quality is comparatively excellent and the transmission power is kept low. This also keeps battery reduction low and decreases the interference to another communication terminal. Conversely, in a case where there is a long distance between the mobile communication terminal and the base transceiver station, that is a case where the mobile communication terminal is located at an end of a service area, the line quality is ensured by increasing the transmission power. In this manner, by increasing or decreasing the transmission power in accordance with the line quality, the line quality of the mobile communication terminal is ensured and the battery duration is also elongated.

As a method of controlling the transmission power to ensure the line quality, a technique described in, for example, Patent Document 1 or Patent Document 2 is known.

The aforementioned Patent Document 1 describes a method of, when a decrease in the propagation path gain is detected at a first radio communication device, the transmission power of a second radio communication device is decreased, and when an increase in the propagation path gain is detected at the first radio communication device, the transmission power of the second radio communication device is increased. Thus, a desired line quality is attained while suppressing an increase in the average transmission power.

In addition, the aforementioned Patent Document 2 describes a method of detecting a transmission success rate at the transmission side and increasing or decreasing the transmission power to make the transmission success rate fall within an allowable range, so that the transmission output power is decreased to the minimum level at which the line quality can be kept.

Patent Document 1: JP 2005-51819 A
Patent Document 2: JP 2006-165742 A

DISCLOSURE OF THE INVENTION

Problem to be Solved by the Invention

It should be noted that, however, as described above, in the method of detecting the propagation path gain by use of the first radio communication device and controlling the transmission power of the second radio communication device that is a communication target in accordance with the detection, the received state at the first radio communication device will determine the value of the transmission power of the second radio communication device. For this reason, there is a possibility that the transmission power of the second radio communication device will continuously be high in some cases, the power consumption will be increased, and the draining of the battery will be accelerated. Also, even if there is an obstacle near the second radio communication device and an unnecessary rise in the transmission power should be avoided, there is a possibility that the transmission power of the second radio communication device will be increased.

Conversely, in a case where the second radio communication device controls the transmission power on its own accord, the deterioration of the line quality will disconnect the line or the excessive power consumption will shorten the battery duration, because the line quality is not observed. Besides, even if the transmission success rate is reflected on the transmission power control as described above, the continuation of a low success rate causes the continuation of a high transmission power. Also in this case, there is a possibility that the battery duration will be shortened or the interference to another mobile communication terminal will be caused.

It is an object of the present invention to decrease the transmission power in an appropriate manner, while suppressing the degradation of the line quality to the minimum.

Means for Solving the Problem

To solve the above problem, there is provided a mobile communication terminal that performs radio communication with a base transceiver station in a mobile communication system, the mobile communication terminal comprising: transmission power controller that controls a transmission power so that the transmission power has a target value; average transmission power calculating means that calculates an average value of the transmission power in a monitoring period that is set; transmission power suppressing means that, when the average value of the transmission power calculated by the average transmission power calculating means is equal to or greater than a threshold value, controls the transmission power to be decreased so that the average value of the transmission power in a control period is set smaller than a threshold value.

According to the present invention, the transmission power is controlled to maintain, for example, the line quality by the transmission power controller. When the average value of the transmission power in the monitoring period is equal to or greater than the threshold value, the transmission power controller controls the transmission power. The average value of the transmission power in the control period is controlled by the transmission power controller to be smaller than the threshold value, thereby decreasing the power consumption while the degradation of the line quality is being suppressed to the minimum.

Additionally, in the mobile communication terminal, the control period may include the monitoring period and a transmission power suppressing period that follows the monitoring period, and the transmission power suppressing means may decrease the transmission power so that the average value of the transmission power in the transmission power suppressing period that is set is smaller than the threshold value, when the average value of the transmission power calculated by the average transmission power calculating means is equal to or greater than the threshold value.

According to the present invention, the transmission power in the transmission power suppressing period that follows the monitoring period is controlled, based upon the average transmission power in the monitoring period that is an initial period of the control period. It is therefore possible to decrease the average transmission power in the control period in an effective manner.

Furthermore, in the mobile communication terminal, average transmission power calculating means may calculate the average value of the transmission power in each of the monitoring periods with the monitoring periods temporally delayed and overlapped, and the transmission power suppressing means may control the transmission power in the control period to be decreased in accordance with the monitoring period having a maximum value of a plurality of the average values of the transmission power calculated by the average transmission power calculating means.

According to the present invention, the transmission power in the control period is controlled to be decreased, among the monitoring periods with temporally delayed and overlapped, in accordance with the monitoring period having a maximum value of the average transmission power. It is therefore made possible to decrease the transmission power in a more effective manner.

The mobile communication terminal may further include use state detecting means that detects a use state of the mobile communication terminal, wherein the transmission power suppressing means may change the threshold value in accordance with the use state detected by the use state detecting means.

According to the present invention, the transmission power is controlled to be decreased based upon the threshold value in accordance with the use state of the mobile communication terminal, thereby allowing the decrease in the transmission power in consideration of an effect on the content of the communication.

Moreover, there is provided a transmission power control method in a mobile communication terminal that performs radio communication with a base transceiver station in a mobile communication system, the transmission power control method comprising: controlling a transmission power so that the transmission power has a target value; calculating an average value of the transmission power in a monitoring period that is set; and suppressing the transmission power to be decreased so that the average value of the transmission power in a control period that is set is smaller than the threshold value, when the average value of the transmission power calculated in the calculating is equal to or greater than the threshold value, in controlling a transmission power.

According to the present invention, the transmission power is controlled to maintain, for example, the line quality in the controlling. In this situation, when the average value of the transmission power in the monitoring period calculated in the calculating is equal to or greater than the threshold value, the transmission power is controlled to be decreased in the suppressing. It is therefore made possible to decrease the power consumption while the degradation in the line quality is being suppressed to the minimum.

Advantageous Effects of the Invention

According to the present invention, when the average value of the transmission power in the monitoring period is equal to or greater than the threshold value, the transmission power is controlled to be decreased so that the average value of the transmission power in the control period becomes smaller than the threshold value. It is therefore made possible to decrease the power consumption while the degradation in the line quality is being suppressed to the minimum.

BRIEF DESCRIPTION OF THE DRAWINGS

FIG. 4 is a time chart for description of the operation according to the present invention;

FIG. 5 is an example of a corresponding table; and

BEST MODE FOR CARRYING OUT THE INVENTION

Hereinafter, embodiments of the present invention will be described.

Figure 1:
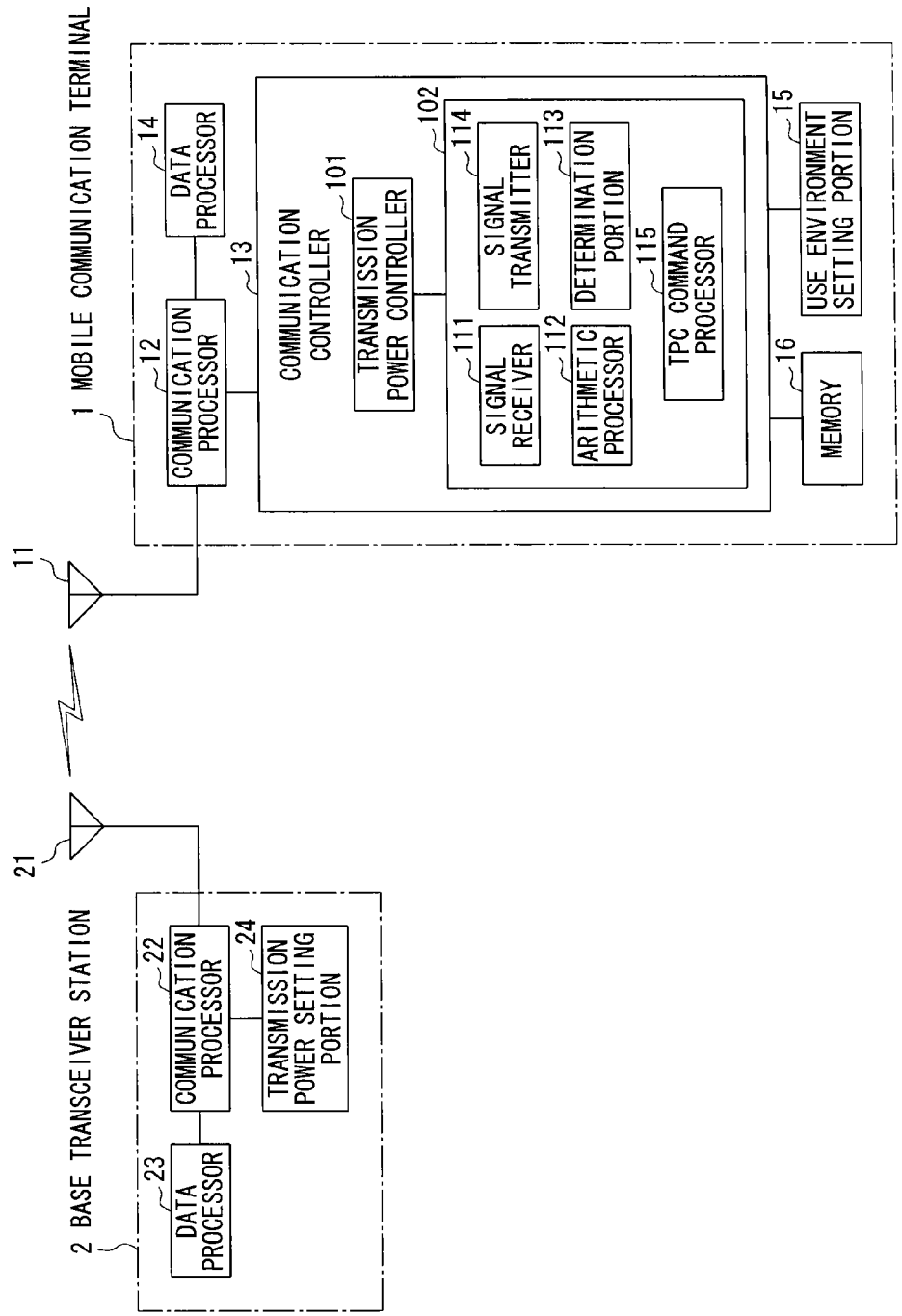
FIG. 1 is a schematic configuration diagram illustrative of an example of a mobile communication system to which the present invention is applied.

FIG. 1 is a configuration diagram illustrative of an example of a mobile communication system to which a mobile communication terminal in accordance with the present invention is applied. In FIG. 1, a mobile communication terminal 1 conducts radio communication with a base transceiver station 2.

As illustrated in FIG. 1, the mobile communication terminal 1 is provided with: an antenna 11 that transmits and receives radio waves; a communication processor 12; a communication controller 13; a data processor 14; a use environment setting portion 15; and a memory 16.

The communication processor 12 is provided with: a baseband processor that converts signals between digital signals and baseband signals; an RF circuit that converts a high frequency signal received by the antenna 11 into an intermediate frequency for demodulation to produce the baseband signals and that also modulates the baseband signals to convert the intermediate frequency to the high frequency signal and transmit the signal via the antenna 11; and a power amplifier that adjusts the transmission power. Thus, the communication processor 12 converts the high frequency signal received by the antenna 11 into digital signals and outputs the digital signals as reception data to the data processor 14. In addition, the communication processor 12 converts the transmission data composed of digital signals applied from the data processor 14 into high-frequency analog signals, and transmits the analog signals via the antenna 11. Furthermore, the communication processor 12 increases or decreases the transmission power in accordance with a transmission power control signal applied from the communication controller 13, at the time of transmitting data.

The communication controller 13 includes a transmission power controller 101 and a transmission power setting portion 102.

The transmission power controller 101 generates a transmission power control signal for controlling the communication processor 12 in response to a transmission power instruction determined by the transmission power setting portion 102, and outputs the transmission power control signal to the communication processor 12 and the transmission power setting portion 102.

The transmission power setting portion 102 is provided with: a signal receiver 111; an arithmetic processor 112; a determination portion 113; a signal transmitter 114; and a TPC command processor 115.

The transmission power control signal generated by the transmission power controller 101 is input into the signal receiver 111.

Based upon the transmission power instruction applied from the TPC command processor 115, to be described later, the arithmetic processor 112 generates a transmission power instruction signal for causing the communication processor 12 to generate the transmission power in accordance with the transmission power instruction, and outputs the transmission power instruction signal to the signal transmitter 114.

In addition, the arithmetic processor 112 calculates the time average of the transmission power (hereinafter, referred to as average transmission power Wa) of the mobile communication terminal 1 in a preset monitoring period Ta at a preset timing based upon the transmission power control signal input into the signal receiver 111. Further, when the average transmission power Wa is determined to be equal to or greater than a threshold value TH of the average transmission power as a result of determination at the determination portion 113, to be described later, the arithmetic processor 112 calculates the transmission power so that the average value of the transmission power in a preset control period Tc is smaller than the above threshold value TH.

In this situation, the control period Tc represents the period from a start point of the monitoring period Ta to an end point of a transmission power suppression period Tb, to be described later, which follows the monitoring period Ta. Then, the arithmetic processor 112 generates an instruction signal for suppressing the average value to generate the transmission power in accordance with thus calculated transmission power, and outputs the instruction signal for suppressing the average value as a transmission power instruction signal to the signal transmitter 114, to be described later, during the transmission power suppression period Tb.

The determination portion 113 sets the threshold value TH based upon corresponding information of the type of use environment and a threshold value corresponding to the type of use environment, stored in the memory 16. As a use environment, for example, two types including basic environment and low transmission power environment are set. The basic environment is, for example, an environment that allows a rise in the transmission power. On the other hand, the low transmission power environment is an environment that needs to decrease the transmission power, because an unnecessary rise of the transmission power is predicted in a case where there is an obstacle in the vicinity or the like.

When the determination portion 113 is notified from the use environment setting portion 15 that the use environment is the basic environment, the determination portion 113 sets a first threshold value for the basic environment based upon the corresponding information in the memory 16. On the other hand, when the determination portion 113 is notified that the use environment is the low transmission power environment, the determination portion 113 sets a second threshold value for the low transmission power environment. The second threshold value is set smaller than the first threshold value.

Then, the determination portion 113 compares the threshold value TH set as described above and the average transmission power Wa calculated at the arithmetic processor 112, and notifies the arithmetic processor 112 of the comparison result.

The signal transmitter 114 outputs the transmission power instruction signal calculated by the arithmetic processor 112 to the transmission power controller 101.

The TPC command processor 115 obtains and analyses the TPC command that specifies the transmission power value of the mobile communication terminal 1 included in the reception data obtained by the communication processor 12. Then, the TPC command processor 115 detects the transmission power instruction specified by the base transceiver station 2 that is a communication target, and outputs the transmission power instruction to the arithmetic processor 112.

The data processor 14 executes a given process on the basis of the reception data that has been converted into digital signals by the communication processor 12, and also generates transmission data to be transmitted to the base transceiver station 2 that is a communication target and outputs the transmission data to the communication processor 12.

The use environment setting portion 15 has a key for environment settings, for example. If an operation of specifying the low transmission power environment is performed by use of the key for environment settings, it is determined that the low transmission power environment is specified. If the key for environment settings is not operated at the time of activation or the like or a release operation of the low transmission power environment is performed, it is determined that the basic environment is set. Subsequently, the determination result is output to the determination portion 113.

The threshold value for every type of the use environment has been set beforehand and stored in the memory 16.

In this case, for description, the communication processor 12 and the communication controller 13 are separately described. However, the functionality of the communication controller 13 is included in the communication processor 12, in some cases.

Meanwhile, the base transceiver station 2 is provided with: an antenna 21 that transmits and receives radio waves; a communication processor 22; a data processor 23; and a transmission power setting portion 24.

The communication processor 22 executes data transmission and reception processes with the mobile communication terminal 1 over radio communication via the antenna 21. The communication processor 22 also transmits to the mobile communication terminal 1 the TPC command set by the transmission power setting portion 24, to be described later, together with the transmission data.

The data processor 23 executes a given process based upon the reception data received from the mobile communication terminal 1, and also generates the transmission data to the mobile communication terminal 1.

The transmission power setting portion 24 detects the reception intensity of the reception signal received from the mobile communication terminal 1, and determines the transmission power of the mobile communication terminal 1 based upon the reception intensity. An example is that the transmission power of the mobile communication terminal 1 is set so that the reception intensity of the reception signal received from the mobile communication terminal 1 is constant. Then, the transmission power setting portion 24 generates the TPC command that is a command for specifying the transmission power that has been set, and outputs the TPC command to the communication processor 22.

Next, the operation in accordance with the above embodiments will be described with reference to a flowchart illustrated in FIG. 2.

Figure 2:
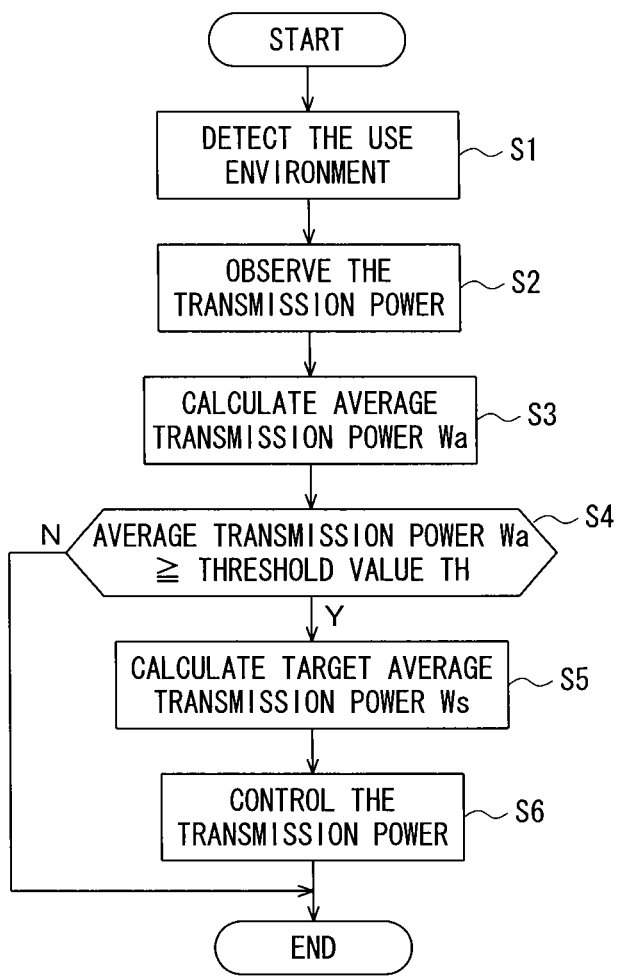
FIG. 2 is a flowchart illustrative of an example of a process procedure of an average transmission power decreasing process executed at a mobile communication terminal.

The mobile communication terminal 1 executes an average transmission power decreasing process as illustrated in FIG. 2 at a preset timing. The mobile communication terminal 1 executes the average transmission power decreasing process when a start event of a preset average transmission power decreasing process occurs, for example, when communication such as a telephone call/data transmission is initiated or when the standby mode is initiated. Alternatively, the mobile communication terminal 1 executes the average transmission power decreasing process, when a preset start event occurs, or when any one of multiple start events occurs.

The mobile communication terminal 1 analyzes at the TPC command processor 115 the TPC command included in the reception signal received from the base transceiver station 2, when the start event of the average transmission power decreasing process does not occur. Then, a transmission power control signal for generating the transmission power in accordance with the transmission power instruction specified by the base transceiver station 2 is generated by the transmission power controller 101. In response thereto, the transmission power is controlled at the communication processor 12, so the transmission data is transmitted at the transmission power in response to the instruction given from the base transceiver station 2 (hereinafter, referred to as normal transmission output control).

Hence, the base transceiver station 2 is capable of receiving the signal from the mobile communication terminal 1 in an excellent condition.

From this state, in a case where the start event of the average transmission power decreasing process occurs such as a case of starting a telephone call over the mobile communication terminal 1 or the like, the mobile communication terminal 1 initiates the average transmission power decreasing process illustrated in FIG. 2. The mobile communication terminal 1 firstly detects the use environment (step S1).

As the use environment in this situation, unless the settings for the low transmission power environment are not operated, the use environment setting portion 15 determines that the use environment is the basic environment, and then notifies the determination portion 113 of the determination result. The determination portion 113 sets the first threshold value for the basic environment as the threshold value TH based upon the information stored in the memory 16.

Subsequently, monitoring of the transmission power is initiated with this timing set as the start point of the monitoring period Ta. The time average is successively calculated in response to the change in the transmission power (step S2). When the time average in the entire monitoring period Ta is calculated, the calculated result is set as the average transmission power Wa in the monitoring period Ta (step S3).

Next, the average transmission power Wa calculated at step S3 is compared with the threshold value TH (step S4). If the average transmission power Wa is smaller than the threshold value TH, the processing is terminated without change. Thereafter, the normal transmission output control is given.

In this manner, the mobile communication terminal 1 continuously transmits the transmission data at the transmission power in response to the TPC command given from the base transceiver station 2. Therefore, the transmission power will not be decreased. Despite the data is transmitted at a comparatively low transmission power, the transmission power will not be decreased unnecessarily.

Conversely, if the average transmission power Wa detected at step S3 is equal to or greater than the threshold value TH, the processing moves from step S4 to step S5. A target average transmission power Ws is calculated so that the average value of the transmission power in the control period Tc is smaller than the threshold value TH (that is the first threshold value for the basic environment). Since then, the transmission power is controlled in the transmission power suppressing period Tb such that the average value of the transmission power in the transmission power suppressing period Tb is equal to the target average transmission power Ws (step S6).

Figure 3A:
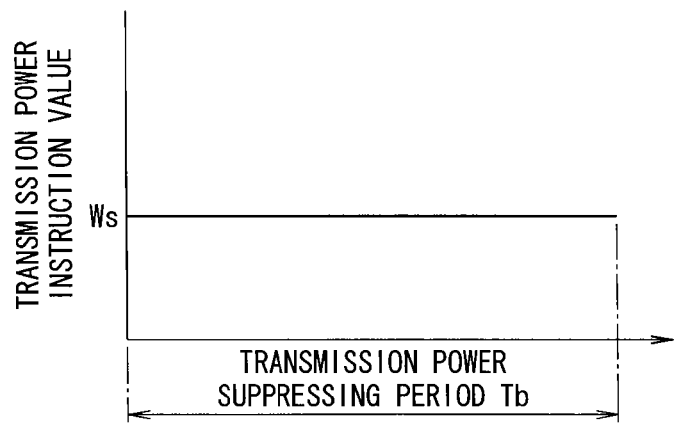
FIG. 3A to FIG. 3C are time charts illustrative of an example of an instruction value of a transmission power in a transmission power suppressing period Tb.
Figure 3B:
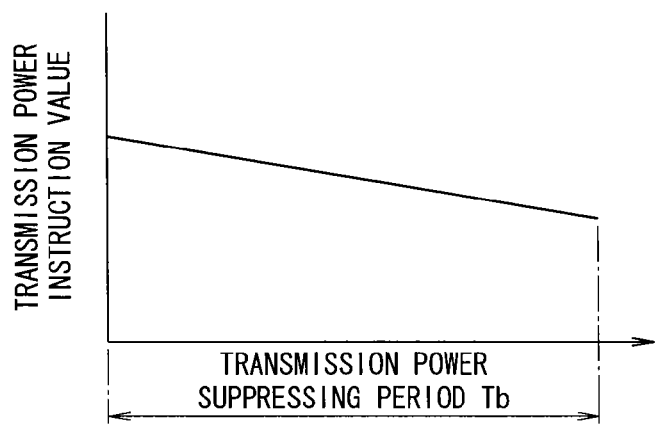
Figure 3C:
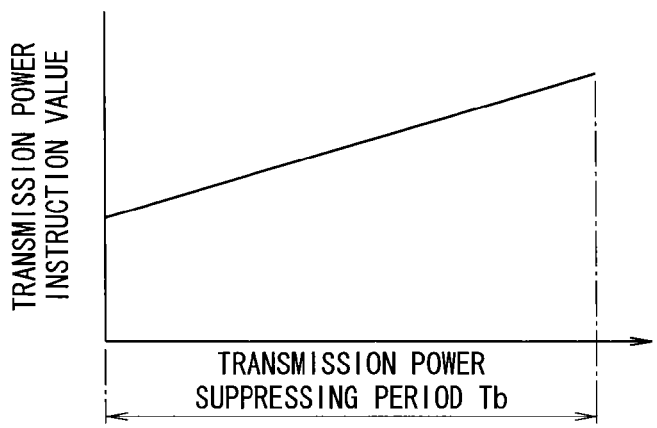

As an instruction value of the transmission power in the transmission power suppressing period Tb, a certain value as illustrated in FIG. 3A, that is the target average transmission power Ws should be set. Also, as illustrated in FIG. 3B, the transmission power may be decreased at a certain gradient. Conversely, as illustrated in FIG. 3C, the transmission power may be increased at a certain gradient. Additionally, the transmission power may be changed at a preset function. The point is that the average value of the transmission power in the transmission power suppressing period Tb may take any value as long as it is equal to or smaller than the target average transmission power Ws.

FIG. 4 is a time chart indicative of changing states in the transmission power of the mobile communication terminal 1 and those of the time average of the transmission power starting from a start point t1 in the control period Tc, in a case where the average transmission power Wa in the monitoring period Ta is equal to or greater than the threshold value TH.

As illustrated in FIG. 4, the normal transmission power control for controlling the transmission power in response to the TPC command given from the base transceiver station 2 is performed in the monitoring period Ta from the time point t1 to the time point t2. Therefore, the transmission power increases or decreases in response to the TPC command.

Then, when the monitoring period Ta ends at the time point t2, the average transmission power Wa in the monitoring period Ta is determined at this time point. In this case, since the average transmission power Wa in the monitoring period Ta is equal to or greater than the threshold value TH, the transmission power is controlled to have a constant value, for example, which is smaller than the threshold value TH, in the transmission power suppressing period Tb from the time point t2 to the time point t3, regardless of the TPC command given from the base transceiver station 2.

Hence, the time average of the transmission power from the start point t1 of the monitoring period Ta gradually decreases from the start point t2 of the transmission power suppressing period Tb, and becomes smaller than the threshold value TH before the end point t3 of the transmission power suppressing period Tb. That is to say, this means that the average value of the transmission power in the control period Tc from the time point t1 to the time point t3 is suppressed to be smaller than the threshold value TH.

Therefore, in a case where the transmission power specified by the base transceiver station 2 as a transmission power of the mobile communication terminal 1 is continuously equal to or greater than the threshold value TH, the average value of the transmission power can be decreased regardless of the instruction given from the base transceiver station 2. This allows the prevention of shortening of the battery duration period, which is caused by the continuation of a comparatively great transmission power, thereby prolonging the battery duration period.

Meanwhile, if there is an obstacle in the vicinity and the communication continues without changing the situation, the transmission power will increase, and in addition, the obstacle will bring unnecessary power dissipation. Therefore, when the mobile communication terminal 1 is used under the environment where the above-described unnecessary power increase in the transmission power should be avoided, its user operates the key for environment settings to specify the low transmission power environment.

Consequently, the use environment setting portion 15 sets the second threshold value for the low transmission power environment that is smaller than the first threshold value, as the threshold value TH, because the low transmission power environment is specified.

Thus, the average value of the transmission power in the control period Tc is controlled to be smaller than the second threshold value, so the average value of the transmission power is suppressed to a value much lower than that of the basic environment.

Accordingly, under the low transmission power environment where the intensity of the transmission power should be considered more carefully, it is made possible to suppress the average value of the transmission power in the control period Tc. It is therefore made possible to suppress the transmission power in an appropriate manner in accordance with the surrounding environment of the mobile communication terminal 1, and it is also made possible to decrease the power consumption.

Moreover, when the average value of the transmission power in the control period Tc is suppressed in this manner, as the monitoring period Ta is set to a period in which an average value of the transmission power required from the base transceiver station 2 for the mobile communication terminal 1 is can be calculated. The transmission power suppressing period Tb is set to a period corresponding to the start event of the average transmission power decreasing process, such as an average talking period over a telephone or the like is set. This allows, for example, the average value of the transmission power during a telephone call to be suppressed to be smaller than the threshold value TH. Also, in this case, the transmission power suppressing period Tb is set to a comparatively short period, the low transmission power control process is executed on every given cycle, and the detection of the average transmission power Wa and the control of the average transmission power are repeatedly performed. This allows the average value of the transmission power to be suppressed at the mobile communication terminal 1 in response to a change in the intensity of receiving the transmission data from the mobile communication terminal 1 at the base transceiver station 2.

(Variation 1)

In the above embodiments, when the low transmission power control process ends, the transmission power may conform to that specified by the TPC command given from the base transceiver station 2. Specifically, after the low transmission power control process ends, for example, the normal transmission power control process is executed for a given period of time and then the low transmission power control process may be executed again.

By executing as described above, whenever the low transmission power control process ends, the transmission power is controlled to be that required from the base transceiver station 2. Therefore, the data transmission with the transmission power suppressed and the data transmission with the transmission power responded to the requirement of the base transceiver station 2 are alternately performed, so the transmission power can be suppressed while the line quality with the base transceiver station 2 is being recovered.

(Variation 2)

In the above embodiments, the description has been given of the case where the monitoring period Ta is set with the time point when the start event for the low transmission power control process occurs set as a beginning, and the transmission power is suppressed based upon the average transmission power Wa in the above period. However, the present invention is not limited to this.

For example, the average transmission power Wa is detected in the monitoring period Ta with multiple time points, selected in a random manner, set as beginnings. The maximum value of the multiple average transmission powers Wa is employed. If the maximum value of the average transmission power Wa is equal to or greater than the threshold value TH, the transmission power in the subsequent transmission power suppressing period Tb may be suppressed. In this case, the observation start timings of the average transmission power are delayed to execute the observation processes of the average transmission power in parallel, so that the maximum value of the average transmission power Wa in each of the monitoring periods Ta is detected, when all the observation processes end. Then, the target average transmission power in the transmission power suppressing period Tb is calculated based upon the maximum value of the average transmission power Wa, so that the average value of the transmission power in the transmission power suppressing period Tb may be controlled to be the target average transmission power.

By executing the processes as described above, the transmission power can be decreased in an effective manner.

(Variation 3)

In the above embodiments, the description has been given of the case where the transmission power is decreased only in the control period Tc. However, the present invention is not limited to this.

For example, when a given control period Tc elapses, in a case where the start event for the average transmission power decreasing process continues such as a case where the telephone call is continuing, the decreasing process may continue. In this case, for example, when the transmission power suppressing period Tc ends, whether or not the start event continues is determined. If the start event continues, the transmission power may be controlled to be smaller than the threshold value TH.

(Variation 4)

In the above embodiments, the description has been given of the case where the environment settings are performed by the user by operating the key for environment settings at the mobile communication terminal 1. However, the present invention is not limited to this. For example, the base transceiver station 2 obtains location information of the mobile communication terminal 1 and assumes the use environment of the mobile communication terminal 1 from the location information and map information held beforehand. In addition, the base transceiver station 2 detects the state of the mobile communication terminal 1 including whether or not the mobile communication terminal 1 is in a call-waiting state or the like based upon the communication state with the mobile communication terminal 1. Then, the base transceiver station 2 sets the threshold value TH in accordance with the assumed state of the mobile communication terminal 1. Also, the base transceiver station 2 sets various specified values including the monitoring period Ta, the transmission power suppressing period Tb, and the like, in accordance with the use environment, the call-waiting state, and the like, and then transmits the above threshold value TH and the various specified values to the mobile communication terminal 1. Subsequently, the mobile communication terminal 1 may control the transmission power with the use of the threshold value TH and the various specified values that have been communicated.

(Variation 5)

In the above embodiments, the description has been given of the case where the threshold value TH can be set in accordance with the two types of the use environments including the base environment and the low power transmission environment. However, the present invention is not limited to this. For example, only the threshold value TH in accordance with the basic environment can be set. Moreover, the threshold value TH may be set in accordance with three or more types of the environments.

Additionally, the description has been given of the case where the threshold value TH is set in accordance with the use environment by the user by operating the key for environment settings. However, the present invention is not limited to this. For example, a threshold value setting key is provided for setting the threshold value TH, instead of the key for environment settings. Then, the average transmission power decreasing process may be executed with the use of the threshold value TH that has been selected by the threshold value setting key. The threshold value TH can be changed in accordance with the surrounding environment of the mobile communication terminal 1 by the provision of the threshold value setting key for setting the threshold value TH as described above. In addition, for example, the transmission power can be adjusted in accordance with the remaining amount of the battery by the user by setting the threshold value TH in accordance with the remaining amount of the battery of the mobile communication terminal 1.

(Variation 6)

In the above embodiments, the description has been given of the case where the average transmission power is decreased with the threshold value TH, the monitoring period Ta, and the transmission power suppressing period Tb that are commonly used, regardless of the type of the start event for the average transmission power decreasing process such as the communication start time, the call-waiting start time, or the like. However, the present invention is not limited to this.

For example, the threshold value, the monitoring period Ta, and the transmission power suppressing period Tb may be set for every type of the start events, so that, when any of the start events occurs, various types of specified values in accordance with the start event may be detected and the process may be executed based upon the settings. Also, various types of specified values may be provided for each use state of the mobile communication terminal 1 such as speech communication, data communication, TV telephone communication, and the like, so that the various types of specified values in accordance with the use state may be read out at the time of starting communication to execute a process based upon the settings.

In this case, for example, as illustrated in FIG. 5, the threshold value TH, the monitoring period Ta, and the transmission power suppressing period Tb are set for every start event of the average transmission decreasing processes, such as the speech communication, the data communication, the TV telephone communication, the start of a call-waiting state, and the like. Moreover, these specified values are set for each use environment, and the corresponding table composed of information on the above various specified values is stored in the memory 16.

Figure 6:
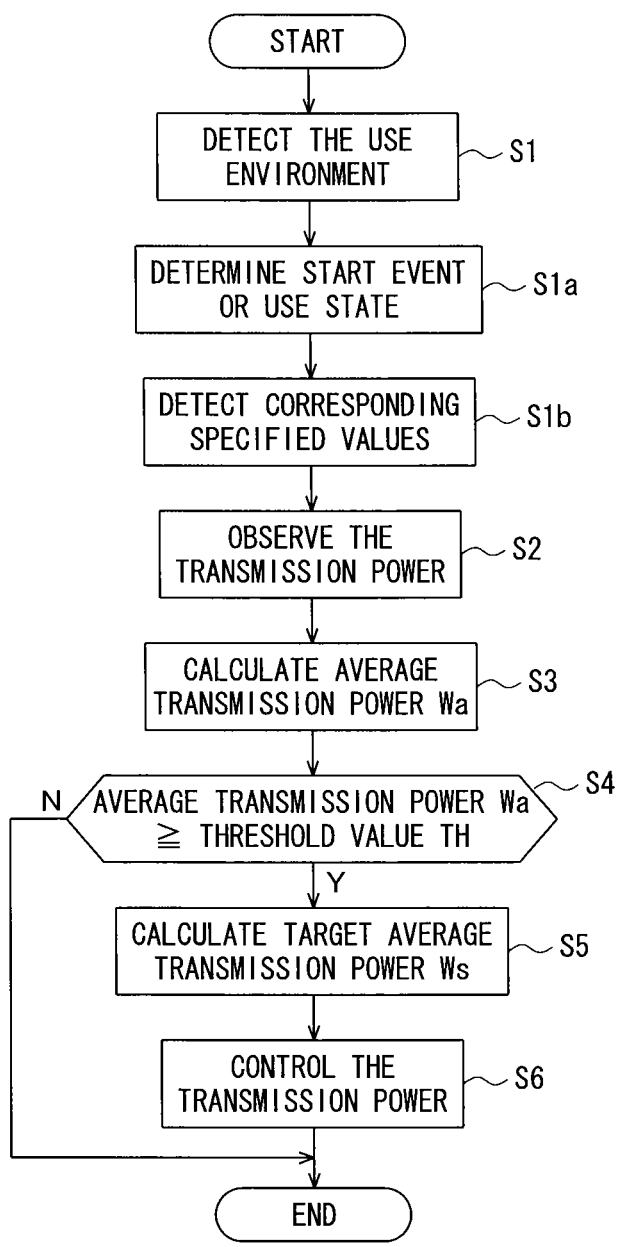
FIG. 6 is a flowchart illustrative of another process procedure of the average transmission power decreasing process.

Then, the mobile communication terminal 1 executes the average transmission power decreasing process based upon a flowchart illustrated in FIG. 6. Herein, the same processes with those illustrated in FIG. 2 have the same numerals, so the detailed description thereof will be omitted.

That is, the use environment is detected at step S1, and subsequently, processing moves to step S1*a* to determine which one of the start events of the average transmission power decreasing process is executed, or in which one of the use states including the speech communication, the data communication and the TV telephone communication, the communication is performed.

Next, processing moves to step S1*b* to read from the corresponding table stored in memory 16 various specified values in accordance with the use environment, the start event, and the use state, specified at step S1 and step S1*a*.

Then, the observation of the transmission power is initiated and the time average of the transmission power is successively calculated (step S2). When the monitoring period Ta specified at step S1*b* elapses, the time average of the transmission power at this point of time is set for the average transmission power Wa in the monitoring period Ta (step S3).

Subsequently, the calculated average transmission power Wa is compared with the threshold value TH specified at step S1*b* (step S4). When the average transmission power Wa is smaller than the threshold value TH, processing ends without change and the normal transmission output control is executed. Conversely, when the average transmission power Wa is equal to or greater than the threshold value TH, processing moves to step S5. The target average transmission power Ws in the transmission power suppressing period Tb is calculated to make the target average transmission power Ws smaller than the threshold value TH in the control period Tc specified at step S1*b*. The transmission power is controlled in the transmission power suppressing period Tb so that the average value of the transmission power becomes the target average transmission power Ws in the transmission power suppressing period Tb (step S6).

Consequently, the average transmission power decreasing process is executed based upon the various specified values in accordance with the use environment and specified values suited for the start events including the use state or the call-waiting state. Accordingly, control is accomplished in accordance with not only the use environment but also the type of the start event such as the use state or the call-waiting state, thereby suppressing the transmission power in a more appropriate manner.

(Variation 7)

In the above embodiments, the description has been given of the case where the mobile communication terminal 1 and the base transceiver station 2 communicate with each other. However, the present invention may be applicable to a case where data communication is accomplished between communication terminals that are capable of conducting radio communication. Also in this case, both of the communication terminals execute the average transmission power decreasing process, thereby allowing the average transmission power to be decreased at each of the communication terminals.

(Variation 8)

In the above embodiments, the description has been given of the case where when the average transmission power Wa is equal to or greater than the threshold value TH (referred to as THa), the decreasing control is accomplished so that the average value of the transmission power in the control period Tc becomes smaller than the threshold value TH (referred to as THc). However, the present invention is not limited to this.

The threshold value THc for the decreasing process is not necessarily identical to the threshold value THa of the average transmission power Wa, and may be smaller than the threshold value THa. The point is that the threshold value THc for the decreasing control may take any value as long as it is smaller than the average transmission power Wa. The decreasing control is accomplished to make the threshold value THc smaller than the average transmission power Wa, thereby resulting in the decrease in the average value of the transmission power in the control period Tc.

In the above embodiments, the process for controlling the transmission power at the communication processor 12 based upon the transmission power control signal in response to the transmission power obtained at the TPC command processor 115 transmission power control means and the transmission control step. The process at step S2 and step S3 in FIG. 2 correspond to the average transmission power calculating means and the average transmission power calculating step. The process at step S5 and step S6 correspond to the transmission power suppressing means and the transmission power suppressing step.

The process at step S1*a* in FIG. 6 corresponds to the use state detecting means.

The invention claimed is:

1. A mobile communication terminal that performs radio communication with a base transceiver station in a mobile communication system, the mobile communication terminal comprising:
   a use state detecting unit for detecting a use state in communication of the mobile communication terminal about an occurrence of a start event of a transmission power decreasing process of decreasing a transmission power of the mobile communication terminal;
   an average transmission power calculating unit for calculating a monitoring period average value that is an average value of the transmission power from the mobile communication terminal to the base transceiver station in a monitoring period that is set beforehand and that is a period for calculating the average value of the transmission power;
   a memory for storing a corresponding table for setting a threshold value of the monitoring period average value for each use state of the mobile communication terminal;
   a determination unit for comparing the monitoring period average value calculated by the average transmission power calculating unit with the threshold value set in the corresponding table in accordance with the use state of the mobile communication terminal detected by the use state detecting unit; and
   a transmission power suppressing unit for, when the monitoring period average value is equal to or greater than the threshold value, controlling the transmission power from the mobile communication terminal to the base transceiver station to be decreased by transmitting an instruction signal for suppressing the average value during a transmission power suppressing period, so that the average value of the transmission power in a control period that is a period from a start point of the monitoring period to an end point of the transmission power suppressing period following the monitoring period is set equal to or smaller than the threshold value;
   wherein the transmission power suppressing unit changes the threshold value by referring to the corresponding table stored in the memory in accordance with the use state detected by the use state detecting unit;
   wherein the monitoring period is a period of not transmitting the instruction signal for suppressing the average value and a period of calculating the monitoring period average value;
   wherein the transmission power suppressing period that follows the monitoring period is a period of not being involved in calculating of the monitoring period average value; and
   wherein the average transmission power calculating unit and the transmission power suppressing unit are provided in the mobile communication terminal.

2. The mobile communication terminal according to claim 1,
   wherein the average transmission power calculating unit calculates the monitoring period average value of the transmission power in each of the monitoring periods, by delaying start timings for observing a plurality of the monitoring period average values one another and executing a plurality of observation processes for the plurality of the monitoring period average values in parallel, and
   wherein the transmission power suppressing unit controls the transmission power in the control period to be decreased in accordance with the monitoring period having a maximum value in the plurality of the monitoring period average values of the transmission power calculated by the average transmission power calculating unit.

3. The mobile communication terminal according to claim 1, wherein the use state in communication of the mobile communication terminal is any one of speech communication, data communication, TV telephone communication, and start of a call-waiting state.

4. A transmission power control method in a mobile communication terminal that performs radio communication with a base transceiver station in a mobile communication system, the transmission power control method comprising:
   detecting a use state in communication of the mobile communication terminal about an occurrence of a start event of a transmission power decreasing process of decreasing a transmission power of the mobile communication terminal;
   calculating a monitoring period average value that is an average value of the transmission power from the mobile communication terminal to the base transceiver station in a monitoring period that is set beforehand and that is a period for calculating the average value of the transmission power;
   comparing the monitoring period average value calculated in the calculating step with a threshold value set in a corresponding table in accordance with the use state of the mobile communication terminal detected in the detecting step, the corresponding table being stored in a memory for setting the threshold value of the monitoring period average value for each use state of the mobile communication terminal; and
   when the monitoring period average value of the transmission power calculated in the calculating is equal to or greater than the threshold value, controlling the transmission power to be decreased by transmitting an instruction signal for suppressing the average value during a transmission power suppressing period, so that the average value of the transmission power in a control period that is a period from a start point of the monitoring period to an end point of the transmission power suppressing period following the monitoring period is set equal to or smaller than the threshold value;
   changing the threshold value by referring to the corresponding table stored in the memory in accordance with the use state detected in the detecting step;
   wherein the monitoring period is a period of not transmitting the instruction signal for suppressing the average value and a period of calculating the monitoring period average value;
   wherein the transmission power suppressing period that follows the monitoring period is a period of not being involved in calculating of the monitoring period average value; and
   wherein the step of calculating the average transmission and the step of controlling the transmission power are performed by the mobile communication terminal.

5. A mobile communication terminal that performs radio communication with a base transceiver station in a mobile communication system, the mobile communication terminal comprising:
   a use environment setting unit for detecting a use environment of the mobile communication terminal to set a basic environment permitted for increasing a transmission power of the mobile communication terminal or to set a low transmission power environment necessary for decreasing the transmission power of the mobile communication terminal;

a use state detecting unit for detecting a use state in communication of the mobile communication terminal about an occurrence of a start event of a transmission power decreasing process of decreasing a transmission power of the mobile communication terminal;

a threshold setting unit for setting a first threshold value or a second threshold value corresponding to the use environment detected by the use environment setting unit and the use state detected by the use state detecting unit, to set the first threshold value when the use environment of the mobile communication terminal is the basic environment or to set the second threshold value lower than the first threshold value when the use environment of the mobile communication terminal is the low transmission power environment;

an average transmission power calculating unit for calculating a monitoring period average value that is an average value of the transmission power from the mobile communication terminal to the base transceiver station in a monitoring period that is set beforehand and that is a period for calculating the average value of the transmission power;

a determination unit for comparing the monitoring period average value calculated by the average transmission power calculating unit with the first threshold value or the second threshold value set by the threshold setting unit; and a transmission power suppressing unit for, when the monitoring period average value is equal to or greater than the second threshold value, controlling the transmission power from the mobile communication terminal to the base transceiver station to be decreased by transmitting an instruction signal for suppressing the average value during a transmission power suppressing period, so that the average value of the transmission power in a control period that is a period from a start point of the monitoring period to an end point of the transmission power suppressing period following the monitoring period is set equal to or smaller than the second threshold value;

wherein the monitoring period is a period of not transmitting the instruction signal for suppressing the average value and a period of calculating the monitoring period average value;

wherein the transmission power suppressing period that follows the monitoring period is a period of not being involved in calculating of the monitoring period average value; and wherein the average transmission power calculating unit and the transmission power suppressing unit are provided in the mobile communication terminal.

\* \* \* \* \*